Sept. 16, 1930.  W. AITKENHEAD  1,775,711
AGRICULTURAL MACHINERY
Filed Nov. 13, 1928  3 Sheets-Sheet 1

INVENTOR
William Aitkenhead,
BY
Anderson & Mason,
ATTORNEYS.

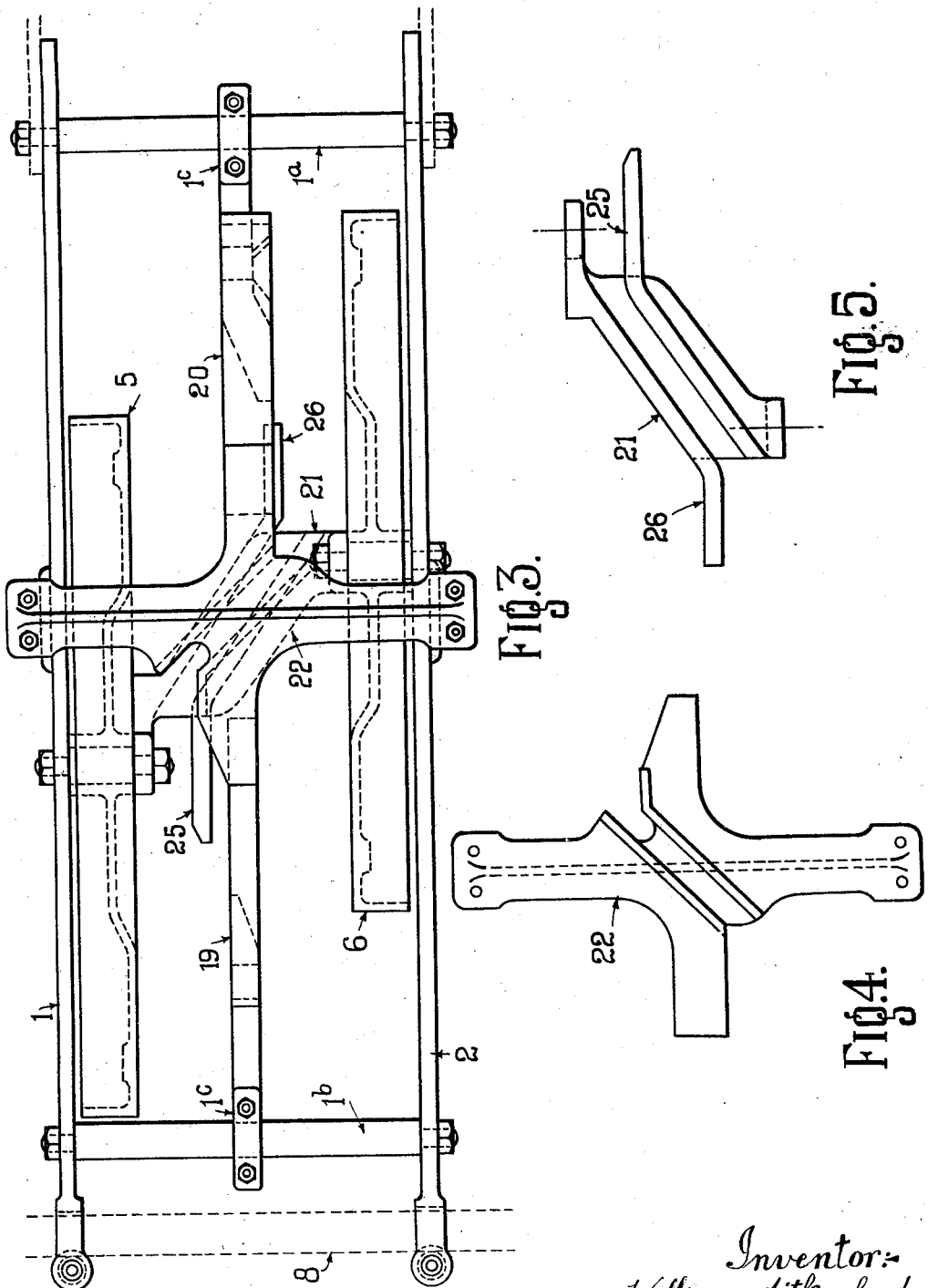

Patented Sept. 16, 1930

1,775,711

UNITED STATES PATENT OFFICE

WILLIAM AITKENHEAD, OF FAILSWORTH, ENGLAND

AGRICULTURAL MACHINERY

Application filed November 13, 1928, Serial No. 319,092, and in Great Britain November 16, 1927.

The invention relates to an improved agricultural machine, more particularly suitable for the thinning of crops, digging of potatoes and the like purposes.

According to the invention, a plurality of digging implements, such as hoes, shovels, forks, spuds or the like are mounted to be bodily rotated about a horizontal or substantially horizontal axis in a plane parallel to the direction of motion of the machine, and are also mounted on lateral axes which are always maintained parallel to a horizontal plane, such as the ground upon which the implement is working, whilst means are provided to displace the tools periodically at right angles to the direction of the motion of the machine. Usually the implement will comprise ground wheels, and the machine be operated by the motion of such wheels.

In one example of the invention, the machine comprises a frame supporting a pair of wheels, spaced out of axial line with each other and rotating in a plane parallel with the direction of motion of the machine about stub axles on said frame, these wheels being interconnected by cross-bars freely pivoted thereto at each end to corresponding points and carrying horizontal pivotal supports for the digging implements, relatively stationary cam means being provided on the machine for the guiding of said implements about their pivotal supports.

The invention will be more particularly described with reference to the accompanying drawings, in which:—

Fig. 3 is a plan view (in part) of the machine.

Figs. 4 and 5 are detached inverted plan view of two cams hereinafter described.

The machine shown comprises a frame composed of a pair of side members 1, 2, adapted to receive bolts 3, 4, forming stub axles for wheels 5, 6, which are offset one from the other and which are adapted to rotate on the ground. The frame may be provided with extension handles, as indicated at 7, whereby the whole frame may be lifted off the ground and swung around the draw axle 8 attached to a fore carriage or other means for drawing the apparatus along the ground.

Figure 1:
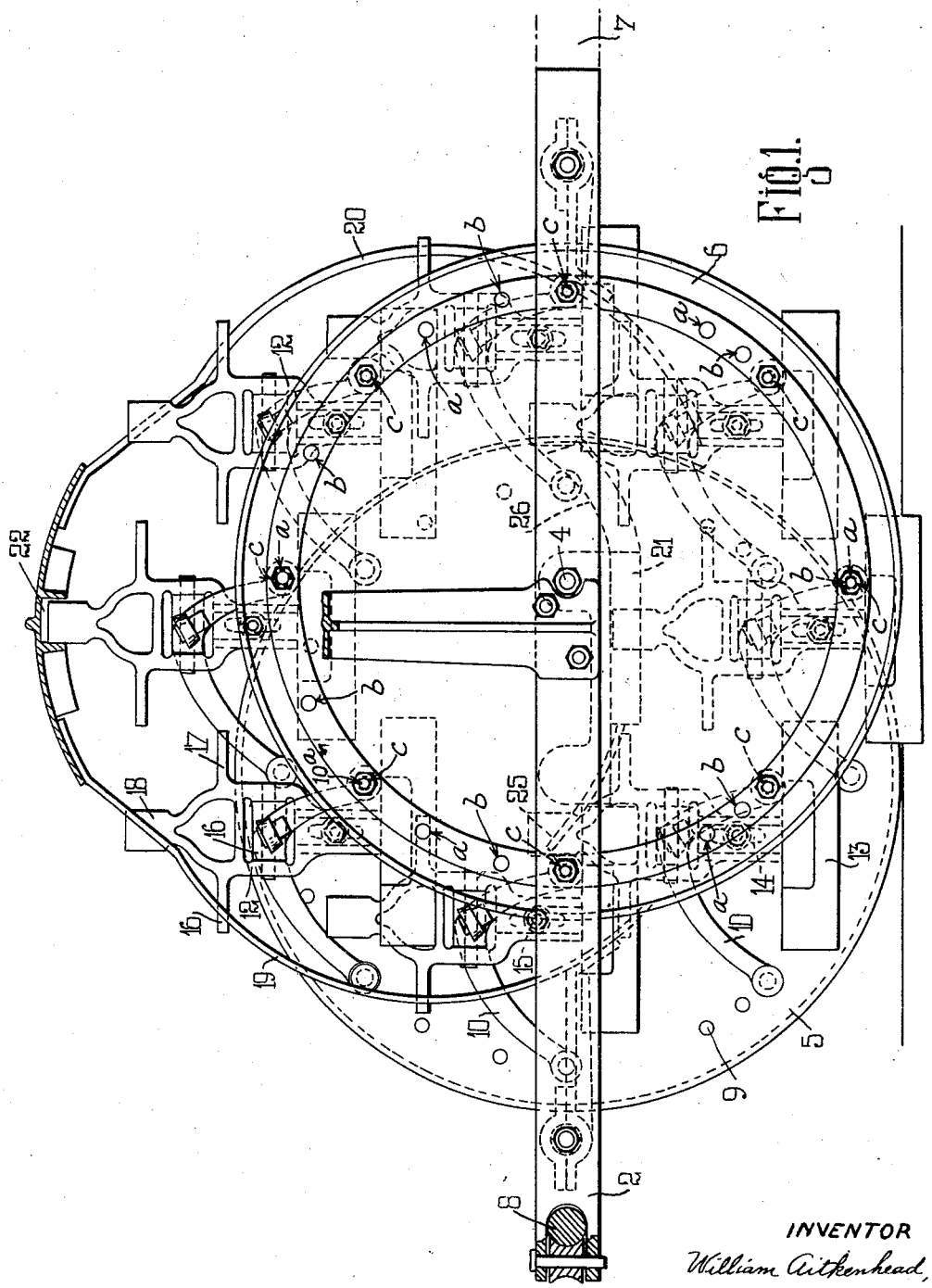
Fig. 1 is an outside elevation of one construction of the improved machine.

Each wheel is provided with a number of perforations 9, in certain of which are detachably and pivotally mounted cross-pieces 10, extending from one wheel 5 to the other 6. These cross-pieces 10 can be detached when desired and others of different form and purposes substituted therefor. The spacing of these cross-pieces 10 can be adjusted as desired, and as shown in the drawings, Fig. 1, groups of perforations are formed in the wheels for this purpose. In the example shown, three groups of perforations $a, b, c$ are formed, one group $a$ consisting of 6 perforations equally spaced apart by 60° substantially adjacent the periphery of the wheels, a second group $b$ consisting of 7 perforations also equally spaced apart, and a third group $c$ of 8 perforations.

The cross-pieces 10 are in the form of forgings of arched formation and with their extremities formed with perforated bosses, the outer faces of which are parallel with one another and with the inner faces of the ground wheels 5, 6, although the main portion of each cross-piece is diagonally disposed in relation to the planes of the wheels. Studs or pivots 10$^a$ and nuts serve to carry and connect the cross-pieces to the wheels, while leaving the wheels free to rotate without affecting the diagonal disposition of the cross-pieces, except to carry them bodily around. The eccentric and straddle-like setting of the cross-pieces prevents the cross-pieces rotating about their pivots.

Each cross-piece 10 is formed with a boss 11 forming a horizontal bearing for an implement carrier 12. The implement such as a hoe, fork, shovel, spud 13 or the like can be detachably secured thereon by pin-and-slot connection 14 to enable the implements to be fixed in any one of a number of vertical positions by a bolt 15 to penetrate the ground to any desired depth.

The carrier 12 has, in the form of construction illustrated, three extension pieces 16, 17, 18 adapted to co-operate with cam surfaces, 19, 20 and 21, 22 respectively.

These cam surfaces are best seen in Figs. 3, 4, and 5. The cam 21 is in the form of a metal plate with diagonal channel groove on its under side and is secured at each end to the stub axles 4. The cam 22 is also in the form of a metal plate with diagonal channel or groove on its under side and secured at each end to the machine framing. The cams 19 and 20 consist of curved metal bars secured at one end to the cam plate 22, and at or near the other end to cross rods 1$^a$, 1$^b$ respectively by brackets 1$^c$, shown dotted in Fig. 1.

The cam surface 21 is preferably arranged to operate a fairly rapid displacement of the implement 13 about its horizontal axis transversely to the forward direction of motion of the implement, whilst the cam surface 22 moves over the implement from one position to the other, so that with the action of the cam surface 19, 20 leading thereto, the implements are smoothly guided.

The cam surface 21 is provided with guide extensions 25, 26 for the purpose of preventing angular displacement of the carrier 12 about its pivot prior to and subsequent to the transverse displacement thereof during its passage along the cam surface 21.

If desired, rollers 23 are provided on lugs connected to the cross-pieces 10 which bear against flat abutment surfaces attached to the wheels 5, 6, or which actually may be part of these, the purpose of which rollers 23 is to assist in taking up the side thrusts due to the action of the implement 13 on the ground.

Figure 2:
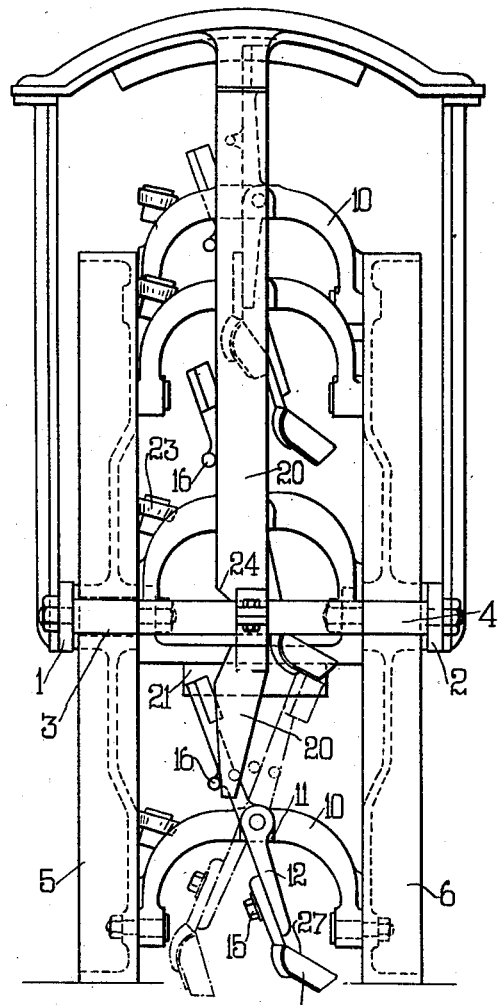
Fig. 2 is a corresponding end view.

Additional cam surfaces, or depressions 24 in the side cam surfaces 20 may be provided to give an extra motion to the implement 13 for discharging any material which may stick therein after the digging operation of these is complete. It will be seen that the implement such as a shovel, fork, spud, hoe or the like will in the forward progression of the apparatus over the ground, move down into the ground or the ridge at the side of the wheel 6 and between the wheels 5 and 6 and dig a portion of earth which will be displaced laterally of the machine as the implement is moved from the dotted line position to the full line position shown in Fig. 2.

The implements may, if desired, be so spaced around the periphery of the wheels 5, 6, that there will be an untouched space of the ground or earth ridge between successive shovel or fork bites. The machine therefore, will be useful in this case for the thinning of crops.

The frame 1, 2, may preferably have some degree of lateral motion along the draw bar 8, so that irrespective of the direction of forward progression, the device, within limits, can be moved laterally along said bar as desired by means of the handle 7.

The digging implements are preferably adjustable radially upon their supports to regulate the depth of cut or bite into the ground. Further, where hoes or shovels are provided, these preferably have vertical side flanges with sharp edges 27 so that a sharp cut or bite is taken from the ground.

What I claim is:—

1. An agricultural machine comprising a frame, a pair of ground wheels, of equal diameter, mounted upon parallel offset stub axles in the frame, rigid cross members between the wheels pivoted at each end to corresponding points in the respective wheels, relatively to the ground, the axes of the pivots being parallel to the wheel axles, digging tools pivotally mounted on the cross members and cam mechanism for imparting a digging motion to each tool in a plane at right angles to the direction of movement of the machine.

2. In an agricultural machine a pair of ground wheels mounted upon off-set axles and connected by cross members, which form carriers for digging tools and serve to provide the support and resistance necessary for the carriage and actuation of the digging tools, the actuation being produced by the bodily rotation of the cross members and tools, and cam mechanism with which the tools contact during their bodily rotation, as set forth.

3. An agricultural implement comprising in combination a frame, spaced horizontal stub axles in said frame, a pair of wheels having horizontally displaced centres mounted thereon, cross bars freely pivoted at each end near to the periphery of said wheels, guides on said cross bars in planes parallel to the wheels, digging tools pivotally mounted on said guides, a plurality of projections on said digging tools, stationary cams engaging the said projections during the passage of said tools, and a further set of cams operating on said tools to cause the said tools to swing about their guides at right angles to the motion of the wheels.

4. An agricultural implement comprising in combination a frame, spaced horizontal stub axles in said frame, a pair of wheels having displaced centres mounted thereon, cross bars freely pivoted at each end near to the periphery of said wheels, horizontal guides on said cross bars in planes parallel to the wheels, digging tools freely mounted on said guides, a plurality of projections on said digging tools, stationary cams engaging the said projections during the passage of said tools to allow one tool to clear its neighbour, and a further set of cams operating on said tools to cause the said tools to swing about their guides at right angles to the motion of the wheels, and anti-friction rollers on said cross bars adapted to take side thrust of said digging tools.

5. An agricultural implement comprising in combination a frame, spaced horizontal stub axles in said frame, a pair of wheels having displaced centres mounted thereon, cross bars freely pivoted at each end near to the periphery of said wheels, horizontal guides on said cross bars in planes parallel to the wheels, digging tools freely mounted on said guides, a plurality of projections on said digging tools, stationary cams engaged by the said projections during the bodily movement of said tools and a further set of cams operating on said tools to cause the said tools to swing about their guides at right angles to the motion of the wheels, a cutting element on each digging tool, and means to adjust said cutting element relatively to the body of the digging tool.

In witness whereof I have hereunto signed my name this 31st day of October, 1928.

WILLIAM AITKENHEAD.